United States Patent [19]

Bahnmüller et al.

[11] Patent Number: 5,054,962
[45] Date of Patent: Oct. 8, 1991

[54] PROCESS FOR SEALING THE SURFACE OF DUMPS

[75] Inventors: Heinz Bahnmüller, Kuerten; Hans-Otto Fricke, Lohmar; Bernd Koglin, Bergisch-Gladbach; Rolf Rink, Cologne; Wolfgang Vogel, Siegburg, all of Fed. Rep. of Germany

[73] Assignee: Bayer Aktiengesellschaft, Leverkusen, Fed. Rep. of Germany

[21] Appl. No.: 649,244

[22] Filed: Jan. 31, 1991

Related U.S. Application Data

[63] Continuation of Ser. No. 441,810, Nov. 27, 1989, abandoned.

[30] Foreign Application Priority Data

Dec. 15, 1988 [DE] Fed. Rep. of Germany ....... 3842213

[51] Int. Cl.⁵ .................................................. B09B 1/00
[52] U.S. Cl. ..................................... 405/129; 405/128; 252/633
[58] Field of Search .................. 405/128, 129, 258, 52, 405/263; 252/633

[56] References Cited

U.S. PATENT DOCUMENTS

| | | | |
|---|---|---|---|
| 1,935,090 | 11/1933 | Holland | 405/129 |
| 3,586,624 | 6/1971 | Larson | 405/129 |
| 3,614,867 | 2/1970 | Nieman | 405/129 |
| 3,705,851 | 12/1972 | Braver | 405/129 X |
| 3,732,697 | 5/1973 | Dickson | 405/129 |
| 4,519,338 | 5/1985 | Kramer et al. | 405/128 X |
| 4,842,774 | 6/1989 | Golden | 405/129 X |
| 4,897,221 | 1/1990 | Manchak | 405/129 X |

Primary Examiner—Dennis L. Taylor
Attorney, Agent, or Firm—Sprung Horn Kramer & Woods

[57] ABSTRACT

A waste dump of a standard dump class is covered with at least one waste layer of a lower dump class having a correspondingly lower hazard potential. Furthermore, at least the outer waste layer is provided with a surface-sealing system. Particularly good encapsulation of hazardous wastes is achieved if the latter are covered with other waste layers where the dump class decreases in an outward direction, so that each waste layer is enclosed by a waste layer which lies on top and is of a lower dump class. In this way, waste dumps having a high hazard potential can be reliably enclosed for a long time and isolated from the environment at less expense than in the past.

14 Claims, 4 Drawing Sheets

PROCESS FOR SEALING THE SURFACE OF DUMPS

This application is a continuation of application Ser. No. 441,810, filed 11/27/89 now abandoned.

BACKGROUND OF THE INVENTION

Sealing the surface of waste dumps is very important in terms of environmental protection. The long-term physical and chemical interactions of the dump with the terrain in which the dump has been set up are critical. With regard to danger to the environment (hazard potential), 5 different dump classes have been defined, in the following order:

Dump class 5 = Special wastes
Dump class 4 = Commercial and industrial wastes
Dump class 3 = Domestic wastes
Dump class 2 = Building rubble
Dump class 1 = Excavated earth.

In this sequence, the hazard potential decreases from top to bottom; that is to say, the special wastes are attributed the highest hazard potential and the excavated earth the lowest hazard potential. To minimise migration and washing of pollutants out of dumps, a number of regulations on sealing the surface of dumps have recently been defined. Thus, for example for sealing the surface of a dump for special wastes (dump class 5), the following covering layers are prescribed from the inside outward:

A compensating layer of homogeneous, non-binding material, which is at least 0.5 m thick, above the special waste;

over this, where there is a possibility of gas formation, a continuous filtration-stable drainage layer at least 0.3 m thick for gas drainage;

above this a mineral seal which is at least 0.5 m thick and has a permeability $k \leq 5 \times 10^{-10}$ m/s;

on top of this (as a combination seal with the mineral seal), an HDPE plastic sheet at least 2 mm thick;

above this, a 0.3 m thick mineral drainage layer;

and, as the uppermost layer, a 1.0 m to 1.5 m thick protective and vegetation layer such as soil which can be cultivated and planted.

For dumps for domestic waste (dump class 3), a surface seal comprising the following sequence of layers is specified:

Above the waste of dump class 3, a compensating layer;

above this, a gas drain which is at least 0.2 m thick and may be provided with geotextile;

above this, a 0.5 m thick mineral seal having a permeability of $k \leq 5 \times 10^{-10}$ m/s;

above this, possibly a plastic sealing sheet;

above this, a drainage layer at least 0.2 m thick;

and finally once again a protective and recultivation layer.

According to a guideline for building rubble dumps, the following requirements are set for sealing the surface of dumps for building rubble and wastes resembling building rubble (dump class 2):

The thickness of the surface seal should not be less than 50 cm and that of the water-removal layer (drainage layer) should not be less than 30 cm. The permeability of the sealing layer must be $k \leq 1 \times 10^{-8}$ m/s and that of the drainage layer must be $k \leq 1 \times 10^{-4}$ m/s.

For dumps for excavated earths (dump class 1), the same draft guideline requires no surface seals.

The surface-sealing systems for dump classes 3 to 5 according to the present state-of-the-art, which comprise a combination seal of a mineral seal with a plastic sheet lying directly on top, have the following disadvantages:

The plastic sealing sheet has only limited aging resistance, only limited resistance to microorganisms and only limited stability through root penetration and attack by rodents;

particularly on slopes, there are still unsolved problems with regard to the danger of the slipping of the soil layers on the plastic sealing sheet;

because of the small root penetration depth (<2 m) unrestricted planting is not possible. Uncontrolled growth even by deep-rooted plants (for example trees) through natural seeding is to be prevented;

there is no high stability against wind, particularly in the event of incorrect growth.

In these circumstances, it can be seen that the long-term stability and erosion resistance of the known surfacesealing systems are unsatisfactory.

SUMMARY OF THE INVENTION

The invention is applicable here. It is the object to enclose waste dumps having a relatively high hazard potential (relatively high dump classes) in a better manner and more reliably for a long time and to isolate them from the environment. The measures required for this purpose must be economically acceptable; that is to say, any increases in costs in the setting up of dumps must be small and acceptable.

This object is achieved, according to the invention, if a waste dump of a relatively high dump class (for example Classes 3 to 5) is covered with at least one waste layer of a lower dump class having a correspondingly lower hazard potential and if at least the outer waste layer is provided with a surface-sealing system known per se.

This enclosure or encapsulation process is advantageously carried out by a procedure in which several waste layers having dump classes decreasing in an outward direction are deposited successively one on top of the other, so that each waste layer is enclosed by a waste layer which lies above it and is of a lower dump class.

A dump which has a relatively high hazard potential (relatively high dump class) and has been sealed by this method is thus encapsulated and protected by one or more thick layers of wastes of lower hazard potential (lower dump classes) using the relevant surface-sealing systems. The thickness of the individual waste layers having dump classes decreasing in an outward direction should be 1 to 30 m, preferably 3 to 10 m. In this way, the wastes having a higher hazard potential are isolated from the environment with high reliability. On the other hand, wastes having a lower hazard potential need no longer be disposed of separately on a dump specially set up for this purpose, since they are utilised for sealing a dump of a higher class. This has opened up a completely new possibility of fulfilling the basic requirement for utilising wastes of lower dump classes.

The process according to the invention is particularly preferably applied by a procedure in which a dump of Class 5 (special wastes), of Class 4 (commercial and industrial wastes) or of Class 3 (domestic wastes) is covered by a layer of several meters of building rubble (preferably $\geq 3$ m), on which waste layers of dump classes 3 to 5, which layers are provided with a mineral seal, is applied, and is covered on top with a known surface seal suitable for dumps for building rubble. In addition, the resulting dump surface between the mineral seal for the building rubble dump and the layer of cultivatable soil can be enriched with excavated earth of dump class 1. For this purpose, building rubble (dump class 2) and/or excavated earth (dump class 1) are always advantageously applied as an outer dump layer on the dump core with a higher class.

Advantageously, the layer of building rubble, minerals resembling rubble and/or excavated earth is applied to a mineral sealing layer which covers the waste layer underneath.

In a further development of the invention, the outer dump layer is such that slabs or blocks of building rubble compressed under high pressure or minerals resembling building rubble and/or excavated earth are laid like roofing tiles or in the form of a wall over a drainable rubble layer at least 0.3 m thick.

The following advantages are achieved with the invention:

The several meter thick upper dump layer of building rubble, minerals resembling building rubble or excavated earth forms a reliable permanent barrier against rodents and against roots.

The upper dump layer ensures high stability to erosion.

The upper dump layer provides long-lasting protection for mineral seals underneath.

The upper dump layer can serve as a very thick drainage layer.

The upper dump layer allows any plants to be planted. Even deep-rooted plants (trees) and uncontrolled growth through natural seeding are permissible.

Even in the event of uncontrolled growth, there is high stability to wind.

The dump structure permits stable slopes (high slope stability).

The total surface-sealing system is resistant to microorganisms.

Illustrative examples of the invention are described in detail below with reference to drawings.

DETAILED DESCRIPTION OF THE INVENTION

Figure 1:
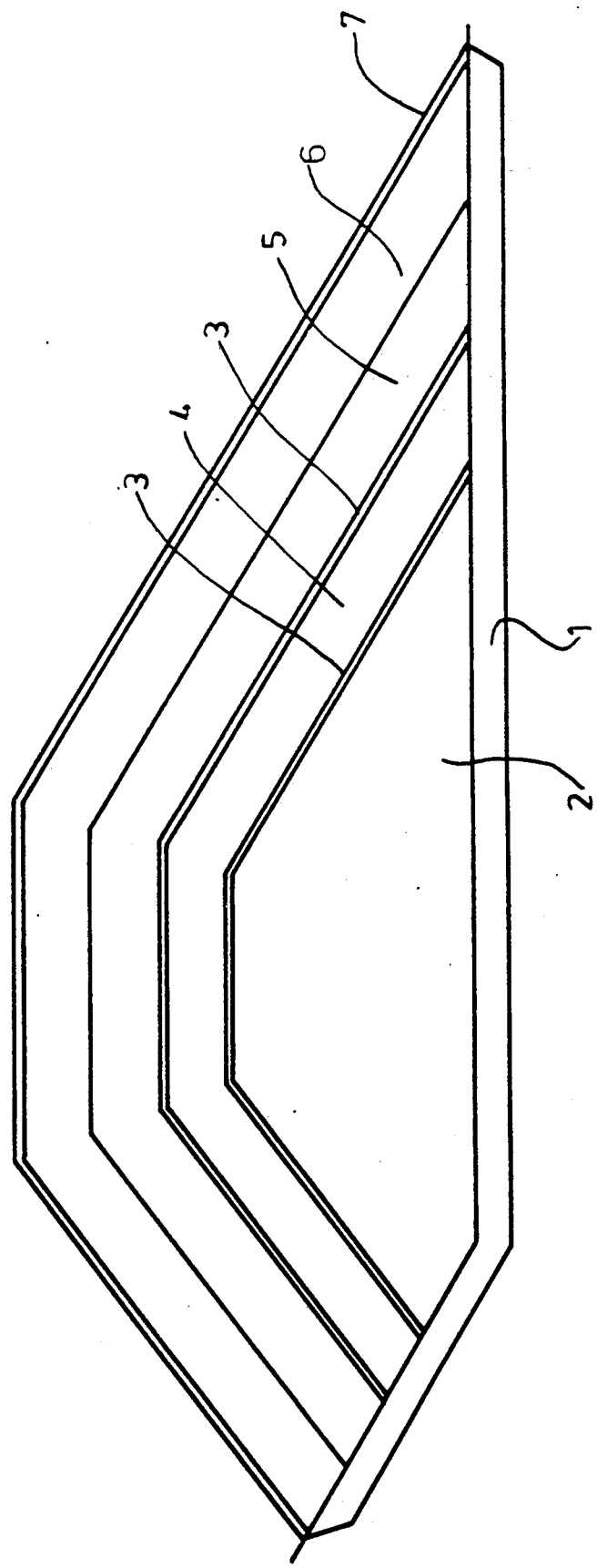
FIG. 1 shows a cross-section through a four-layer dump deposited in accordance with the process according to the invention.

In FIG. 1, a dump 2, for example a special wastes dump of Class 5, is laid out on a base sealing system 1 and covered with a surface-sealing system 3, for example a mineral seal with drainage. A waste layer 4 of a lower dump class, for example Class 4, is then applied on top of this. The waste layer 4 is in turn provided with a surface seal 3. Further waste layers 5 and 6 where the dump classes decrease in an outward direction, for example building rubble (dump class 2) and, on top of this, excavated earth (dump class 1) are then deposited on top of this. The outermost layer 6 is finally covered with a surface-sealing system 7 suitable for outer seals. The base seal may consist of a combination of plastic sealing sheets with mineral sealing layers. The mineral seal usually used is a fine-grain clay material. The gradation of the particle sizes of the mineral material must prevent discharge of very fine constituents.

In the simplest variant of the process according to the invention, a dump of Class 5 (special wastes), of Class 4 (commercial and industrial wastes) or of Class 3 (domestic wastes) is provided with a mineral seal and then covered (encapsulated) with a layer of several meters of building rubble (preferably a coarse fraction of prepared building rubble), on which in turn a surface seal suitable for building rubble dumps is applied. In addition, the dump surface thus formed can also be enriched with excavated soil (dump class 1) between the mineral seal for the building rubble dump and the layer of cultivatable soil.

Figure 2:
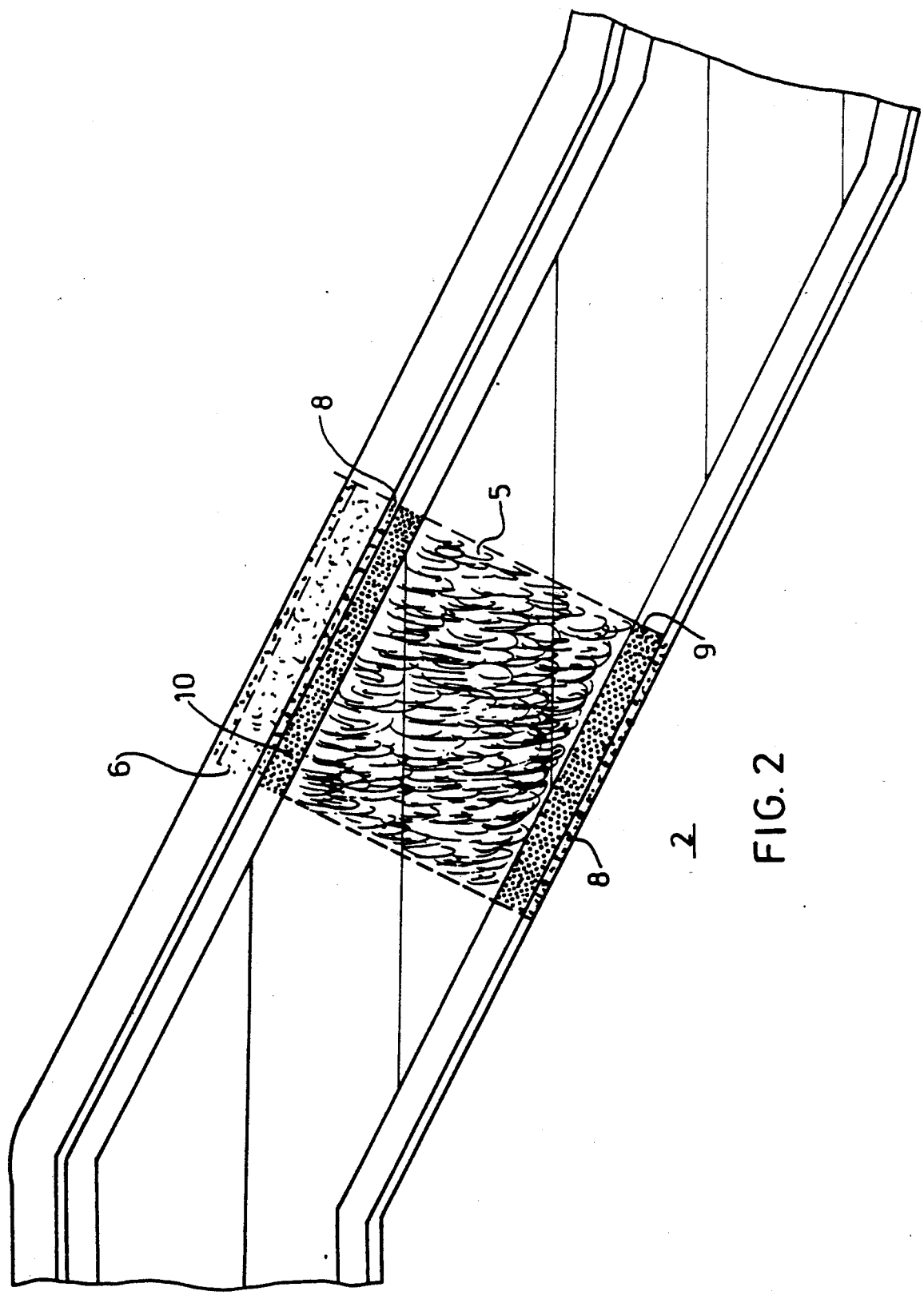
FIG. 2 shows a cross-section through a special wastes dump provided with a mineral seal and encapsulated by a building rubble dump with an associated sealing system.

In the Illustrative Example according to FIG. 2, a special wastes dump 2 is covered with a water-removal and/or gas drainage layer 8 and additionally provided with a mineral sealing layer 9 having a permeability $K_f$ of $\leq 5 \times 10^{-10}$ m/s. A building rubble layer 5 several meters thick is then deposited thereon, the said layer also serving as a root barrier. The building rubble layer 5 is then followed by a mineral sealing layer 10 having a permeability $K_f$ of $\leq 10^{-8}$ m/s and, on top of this, a drainage layer 8. Finally, soil 6 capable of being penetrated by roots is then applied to the multilayer dump, as an uppermost layer.

Figure 3:
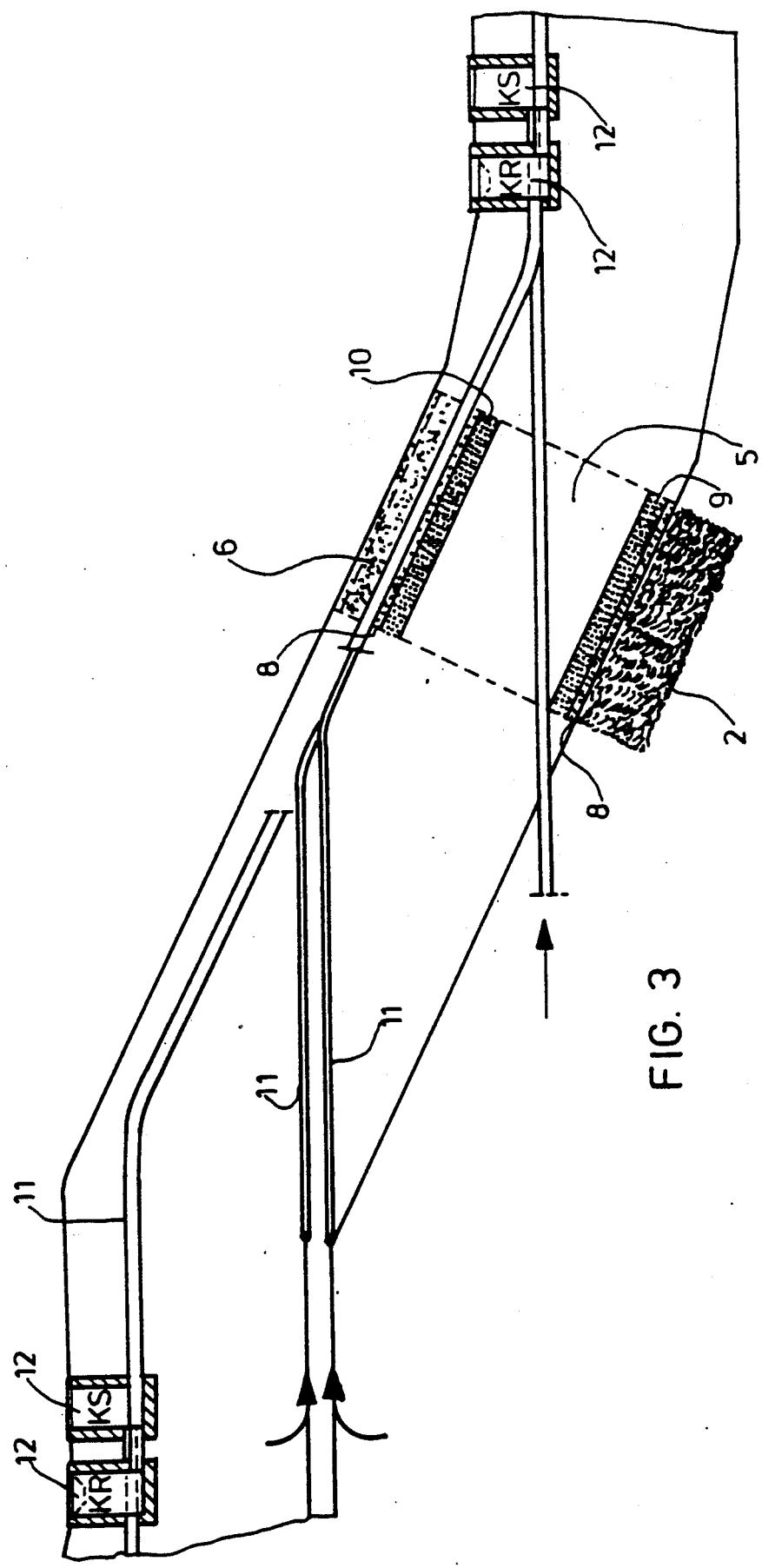
FIG. 3 shows the surface drainage system of the same dump and FIG. 4 shows a corresponding multi-layer dump in which the outer building rubble dump consists partly of slabs or blocks of compressed, mineral material resembling building rubble and/or excavated earth.

The multi-layer dumps described and shown in FIG. 1 and 2 can be provided, in accordance with FIG. 3, with a channel system for removing and controlling surface water which seeps in. Drainage pipes 11 having connections in the individual dump layers are laid for this purpose, the said drainage pipes leading to control shafts 12. Regardless of the analytical result, the seepage water is then fed either to a seepage water channel system or to a rainwater channel system.

Figure 4:
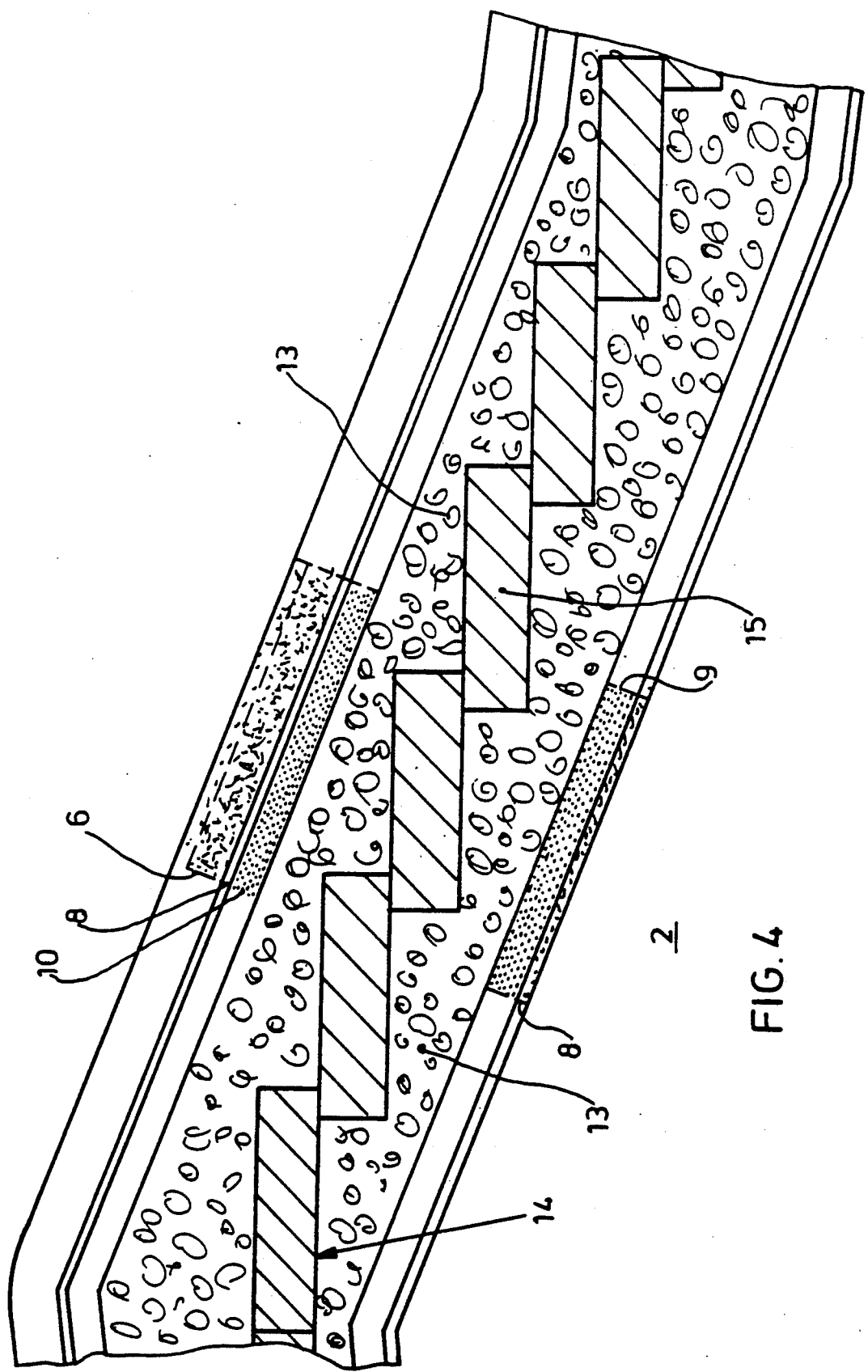

In another well-tried embodiment of the novel disposal process, the outer dump consisting of building rubble and excavated earth 5, 6 and shown in FIG. 4 is composed of three layers. The lower layer 13 consists of drainable building rubble having a thickness of at least 0.3 m. The second layer 14, which lies on top of this, is at least 2 m thick and consists of slabs or blocks 15 of a mineral material resembling building rubble and/or excavated earth compressed under high pressure, which are laid to overlap in the manner of roofing tiles (as in FIG. 4) or like building blocks, in a layer thickness of at least 0.2 m, on the bed 13 of drainable building rubble. The compressed layer 14 of blocks has particularly high mechanical strength. A layer 13 of drainable building rubble is in turn deposited as a third layer on the layer 14 of blocks. The said layer 13 is finally provided with the surface-sealing system comprising the sequences of layers 6, 8 and 10, which system is prescribed for building rubble dumps and is illustrated in FIG. 3.

We claim:

1. A method for the disposal of wastes of different hazard levels, comprising the steps of: disposing wastes of different hazard levels selected from the group consisting of Classes 1-5 in a dump in successive layers with graded hazard levels such that each layer of waste is covered by a layer of waste having a lower hazard level, by disposing a layer of special waste having a hazard level of Class 5 or industrial waste having a hazard level of Class 4 as a bottom layer, covering the bottom layer with a mineral seal, encapsulating the bottom layer with at least one of a layer of drainable building rubble, minerals resembling building rubble and excavated soil of Classes 1 and 2 to form a top layer and surface sealing the top layer with a mineral seal, a drainage layer and cultivatible soil.

2. The method according to claim 1, further comprising disposing an intermediate layer of domestic waste of Class 3 between the bottom layer and the top layer.

3. The method according to claim 1, comprising making the waste layers with a thickness of 1 to 30 m.

4. The method according to claim 1, comprising making the waste layers with a thickness of 3 to 10 m.

5. The method according to claim 1, further comprising collecting surface water which penetrates the drainable building rubble, minerals resembling building rubble and excavated soil in a separate channel system, analyzing the collected water for pollutants and feeding the water for wastewater treatment depending upon the analysis.

6. The method according to claim 1, comprising making a lower portion of the layer of drainable building rubble, minerals resembling building rubble and excavated soil with a thickness of at least 0.3 m consisting of at least 95% of particle fractions of sand, gravel and stones for drainage.

7. The method according to claim 1, further comprising laying slabs or blocks of at least one of building rubble, minerals resembling building rubble and excavated soil compressed under high pressure in the form of roofing tiles or building blocks as an outer layer of at least 0.3 m thick on the drainage layer.

8. A method for the disposal of wastes of different hazard levels, comprising the steps of: disposing wastes of different hazard levels selected from the group consisting of Classes 1-5 in a dump in successive layers with graded hazard levels such that each layer of waste is covered by a layer of waste having a lower hazard level, by disposing a layer of special waste having a hazard level of Class 5 as a bottom layer, covering the bottom layer with a mineral seal, encapsulating the bottom layer with a layer of industrial waste having a hazard level of Class 4 and a mineral seal, covering the encapsulating layer with at least one of a layer of drainable building rubble, minerals resembling building rubble and excavated soil of Classes 1 and 2 to form a top layer and surface sealing the top layer with a mineral seal, a drainage layer and cultivatible soil.

9. The method according to claim 8, further comprising disposing an intermediate layer of domestic waste of Class 3 between the bottom layer and the top layer.

10. The method according to claim 8, comprising making the waste layers with a thickness of 1 to 30 m.

11. The method according to claim 8, comprising making the waste layers with a thickness of 3 to 10 m.

12. The method according to claim 8, further comprising collecting surface water which penetrates the drainable building rubble, minerals resembling building rubble and excavated soil in a separate channel system, analyzing the collected water for pollutants and feeding the water for wastewater treatment depending upon the analysis.

13. The method according to claim 8, comprising making a lower portion of the layer of drainable building rubble, minerals resembling building rubble and excavated soil with a thickness of at least 0.3 m consisting of at least 95% of particle fractions of sand, gravel and stones for drainage.

14. The method according to claim 8, further comprising laying slabs or blocks of at least one of building rubble, minerals resembling building rubble and excavated soil compressed under high pressure in the form of roofing tiles or building blocks as an outer layer of at least 0.3 m thick on the drainage layer.

* * * * *